(12) United States Patent
Bushell

(10) Patent No.: US 7,796,693 B2
(45) Date of Patent: Sep. 14, 2010

(54) SEARCH ALGORITHMS FOR USING RELATED DECODE AND DISPLAY TIMELINES

(75) Inventor: John Samuel Bushell, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1542 days.

(21) Appl. No.: 11/115,085

(22) Filed: Apr. 25, 2005

(65) Prior Publication Data

US 2006/0239357 A1    Oct. 26, 2006

(51) Int. Cl.
*H04B 1/66* (2006.01)
*H04N 11/04* (2006.01)
*H04N 11/02* (2006.01)
*H04N 7/12* (2006.01)

(52) U.S. Cl. .................................. 375/240.23
(58) Field of Classification Search ............ 375/240.01, 375/240.23, 240.25, 240.26; 386/52, 55; 715/723–726; *H04N 11/04, 11/02, 7/12; H04B 1/66*
See application file for complete search history.

(56) References Cited

U.S. PATENT DOCUMENTS 5,892,506 A * 4/1999 Hermanson .................. 715/202
6,018,337 A * 1/2000 Peters et al. .................. 715/723

* cited by examiner

*Primary Examiner*—Tung Vo
(74) *Attorney, Agent, or Firm*—Fish & Richardson P.C.

(57) ABSTRACT

A sequence of video images represented using multiple related timelines can be searched by identifying a first point on a first timeline associated with the sequence of video images, wherein the sequence of video images is comprised of one or more samples, determining a search range on a second timeline associated with the sequence of video images based on a positive offset and a negative offset associated with the one or more samples, and searching the second timeline based on the determined search range for a second point that corresponds to the identified first point. A display offset can be associated with each of the samples comprising the sequence of video images, wherein one or more of the display offsets can comprise a negative value. Additionally, the search range can be based on a maximum positive display offset and maximum negative display offset associated with the one or more samples.

14 Claims, 9 Drawing Sheets

170

| Count | Offset |
|---|---|
| 1 | 20 |
| 2 | -10 |
| 2 | 5 |
| 1 | -10 |
| 4 | 0 |

| Count | Duration |
|---|---|
| 4 | 10 |
| 12 | 20 |
| 1 | 15 |
| 16 | 20 |
| 9 | 5 |

FIGURE 6

SEARCH ALGORITHMS FOR USING RELATED DECODE AND DISPLAY TIMELINES

BACKGROUND

The present disclosure relates to video coding devices and systems, and to search algorithms employed in conjunction with such devices.

Digital-based electronic media formats have become widely accepted. Digital compact discs (CDs) and audio files, such as MP3s (MPEG Audio—layer 3), are now commonplace. Video media, however, has been slower to transition to digital storage and digital transmission formats than audio media. One reason for the slower integration of digital video media formats into the marketplace is the volume of information required to accurately produce video of an acceptable quality from a digital representation. Additionally, encoding and decoding video in a digital format consumes substantial system resources and requires systems capable of processing information at high speeds. Further, the large amounts of information used to represent digital video also necessitate high-bandwidth transmission systems and high-capacity storage systems.

The development of faster computer processors, high-density storage media, and efficient compression and encoding algorithms have led to more widespread implementation of digital video media formats in recent years. The Digital Versatile Disc (DVD) has rapidly replaced video cassettes as the primary storage media for video due to its high image quality, very high audio quality, convenience, and added functionality. Further, the digital Advanced Television Standards Committee video transmission system is in the process of replacing the analog National Television Standards Committee transmission system.

Computer systems have been using various digital video formats for a number of years. Specifically, computer systems have employed many different methods for compressing and encoding or decompressing and decoding digital video. A video compression/decompression method, implemented using hardware, software, or a combination of hardware and software, is commonly referred to as a CODEC. A number of popular digital video compression and encoding systems have been developed based on the standards propounded by the Moving Picture Experts Group (MPEG), including the MPEG-1, MPEG-2, and MPEG-4 standards. Video CDs and early consumer-grade digital video editing systems use the MPEG-1 digital video encoding format. DVDs, video games, and some direct broadcast satellite systems are encoded in accordance with the MPEG-2 standard. MPEG-4 is now being used to deliver DVD (MPEG-2) quality video at lower data rates and smaller file sizes, and thus enables digital video playback on products ranging from satellite television systems to wireless devices.

The MPEG standards set forth methods for compressing a series of images, such as frames or fields, and for encoding the compressed images into a digital bit stream. When a video image is encoded in an MPEG system, the video image is divided into multiple pixel arrays, such as 8×8 pixel blocks or 16×16 pixel macroblocks. Each pixel array can then be independently compressed and encoded.

When performing compression using an MPEG coder, such as a coder that is in compliance with the MPEG-2 or MPEG-4 standard, images may be encoded using three picture types. Specifically, images may be encoded using I-pictures, P-pictures, and B-pictures. I-pictures are encoded with reference only to the information within the picture, and thus may be decoded without reference to any other pictures. P-pictures are encoded with reference to preceding pictures, and thus permit the use of motion compensation to provide for a greater degree of compression. B-pictures are encoded with reference to succeeding pictures, and also permit the use of motion compensation. Because B-pictures are decoded using succeeding pictures, however, some reordering of the sequence of decoded pictures is required prior to display.

Digital video systems have also been developed based on standards other than those published by MPEG. For example, similar standards have been circulated by other organizations, such as the H.261-H.264 standards developed by the International Telecommunication Union. Additionally, proprietary codecs have been developed by other organizations and individuals. For example, Compression Technologies, inc. produces digital video compression tools based on the Cinepak codec and DivXNetworks produces a variety of applications based on the DivX codec. These standard and proprietary codecs represent only a few of the many different ways to compress and encode digital video information.

FIG. 1 presents a media sequence 10, such as a portion of a movie. The media sequence 10 can be organized as a track 12 of digital video information that can include one or more image segments, such as the first image segment 14 and the second image segment 16. In turn, each image segment is comprised of one or more samples, such as frames of image data. The track 12 also can include one or more empty segments 18, which are not associated with any video information and during which no video information is presented. In addition to the track 12 of digital video information, the media sequence 10 also can include a track of audio information and a track of text information (not shown).

The track 12 of digital video information represents the movie timescale and the image segments included in the track 12 are sequentially ordered with respect to time. Therefore, the first image segment 14 in the track 12 is temporally ordered such that it precedes the second image segment 16. During forward play, the first image segment 14 will thus be displayed prior to the display of the second image segment 16. As with the image segments, each of the empty segments 18 included in the track 12 is temporally ordered with respect to the other segments.

The order of the image segments and the empty segments included in the track 12 is defined in an edit list 20. For each image segment and empty segment included in the track 12, there is a corresponding entry, or edit, in the edit list 20. Each edit defines parameters associated with the image segment or the empty segment to which it corresponds. For example, an edit identifies the point in the movie timescale at which the corresponding image segment or empty segment is to begin. The edit also identifies the duration, expressed in terms of the movie timescale, over which the corresponding image segment or empty segment will be played. Further, with respect to image segments, an edit identifies the rate at which the corresponding image segment is to be played back. A playback rate of 1.0 can be associated with the first image segment 14 to indicate that playback should occur at a rate equal to the timing information associated with the first image segment 14. Similarly, a playback rate of 2.0 can be associated with the second image segment 16 to indicate that playback should occur at a rate equal to twice the timing information associated with the second image segment 16.

The one or more samples comprising each of the image segments included in the track 12 are contained in the media 22. If the edit list 20 is modified to insert an additional image segment into the track 12 after the media 22 has been populated, the samples comprising the newly added image segment are also entered into the media 22. It is also possible to delete an image segment from the track 12 during editing, but the samples comprising the deleted image segment are not removed from the media 22. Once a sample has been added to the media 22, its intrinsic properties cannot be modified and the sample cannot be removed from the media 22. The media 22 thereby ensures that every sample associated with an image segment previously identified in the edit list 20 will be available if it is ever required in connection with the track 12.

The media 22 also incorporates the concept of a media timescale, which is a positive integer. The media can be subdivided into X units of media time, where X is a positive integer. The duration of each unit of media time can then be determined to be X÷(media timescale). As described above, the media 22 contains every sample associated with an image segment that has previously been inserted into the track 12. Therefore, the media 22 can be ordered as a sequential list of samples 24, wherein each sample is assigned a unique sequence number. For example, the first sample 26 in the list of samples 24 can be assigned sequence number 1. A sample duration 28 also is associated with each sample in the list of samples 24, indicating how long, in media time, a given sample will be displayed. Sample durations, which are expressed as positive integers, may differ among different samples in the media 22. The media duration 30, in turn, is equal to the sum of the sample durations for all of the samples included in the media 22.

The first sample 26 included in the media 22 has a sample time of zero, which also represents the zero point of the media timescale. The second sample 32 included in the media 22 has a sample time equal to the first sample duration 28, because the sample time of the first sample 26 is zero. Each subsequent sample included in the list of samples 24 has a sample time equal to the sum of the sample time of the preceding sample and the duration of the preceding sample. Therefore, the samples included in the media 22 partition the media time for the entire media duration 30 without any gaps. The structure of the list of samples 24 cannot be adapted to permit the use of B-pictures, however, as it does not separately account for decode times and display times.

SUMMARY

The need to implement multiple-timeline strategies that will permit the use of pictures predicted or interpolated from future pictures, pictures that appear later in the display order, for video compression and decompression is recognized. Accordingly, the techniques and apparatus described here implement algorithms for searching separate decode and display timelines in order to identify one or more specific samples included in a media sequence.

In general, in one aspect, the techniques can be implemented to include identifying a first point on a first timeline associated with a sequence of video images, wherein the sequence of video images is comprised of one or more samples; determining a search range on a second timeline associated with the sequence of video images based on a positive offset and a negative offset associated with the one or more samples; and searching the second timeline based on the determined search range for a second point that corresponds to the identified first point.

The techniques also can be implemented to include associating a display offset with each of the samples comprising the sequence of video images, wherein one or more of the display offsets comprises a negative value. The techniques further can be implemented such that determining a search range further comprises determining a search range on the second timeline based on a maximum positive display offset and a maximum negative display offset associated with the one or more samples. Additionally, the techniques can be implemented to include adjusting the search range if the first point occurs within a decode duration or a display duration.

The techniques also can be implemented such that the search range is extended backward in time by a period equal to the decode duration or the display duration in which the first point occurs. The techniques further can be implemented to include storing the display offsets associated with the samples comprising the sequence of video images in a data structure, wherein the display offsets are run length encoded. Additionally, the techniques can be implemented to include identifying a sample number associated with the second point.

In general, in another aspect, the techniques can be implemented to include processor electronics configured to identify a first point on a first timeline associated with a sequence of video images, wherein the sequence of video images is comprised of one or more samples; determine a search range on a second timeline associated with the sequence of video images based on a positive offset and a negative offset associated with the one or more samples; and search the second timeline based on the determined search range for a second point that corresponds to the identified first point.

The techniques also can be implemented such that the processor electronics are further configured to associate a display offset with each of the samples comprising the sequence of video images and one or more of the display offsets can comprise a negative value. Further, the techniques can be implemented such that the processor electronics are further configured to determine a search range on the second timeline based on a maximum positive display offset and a maximum negative display offset associated with the one or more samples. Additionally, the techniques can be implemented such that the processor electronics are further configured to adjust the search range if the first point occurs within a decode duration or a display duration.

The techniques also can be implemented such that the processor electronics are further configured to extend the search range backward in time by a period equal to the decode duration or the display duration in which the first point occurs. Further, the techniques can be implemented such that the processor electronics are further configured to store the display offsets associated with the samples comprising the sequence of video images in a data structure, wherein the display offsets are run length encoded. Additionally, the techniques can be implemented such that the processor electronics are further configured to identify a sample number associated with the second point.

The techniques described in this specification can be implemented to realize one or more of the following advantages. For example, the techniques can be implemented to permit playback from random points in a media sequence. The techniques also can be implemented to permit scrubbing, or frame-by-frame playback, of a media sequence in forward and reverse directions. Additionally, the techniques can be implemented to permit the identification and queuing of samples required for decoding and display operations. Further, the techniques can be implemented to conserve resources by eliminating the need to store one or more additional tables describing display ordering. In addition, making intrinsic properties of samples non-modifiable once they have been added to the media facilitates search algorithms to cache information derived during one search that can help accelerate future searches while essentially eliminating a risk that the information will be later invalidated.

These general and specific techniques can be implemented using an apparatus, a method, a system, or any combination of an apparatus, methods, and systems. The details of one or more implementations are set forth in the accompanying drawings and the description below. Further features, aspects, and advantages will become apparent from the description, the drawings, and the claims.

BRIEF DESCRIPTION OF THE DRAWINGS

FIG. 5 presents a display table using run length encoding.

FIG. 6 presents a decode table using run length encoding.

Like reference symbols indicate like elements throughout the specification and drawings.

DETAILED DESCRIPTION

Figure 1:
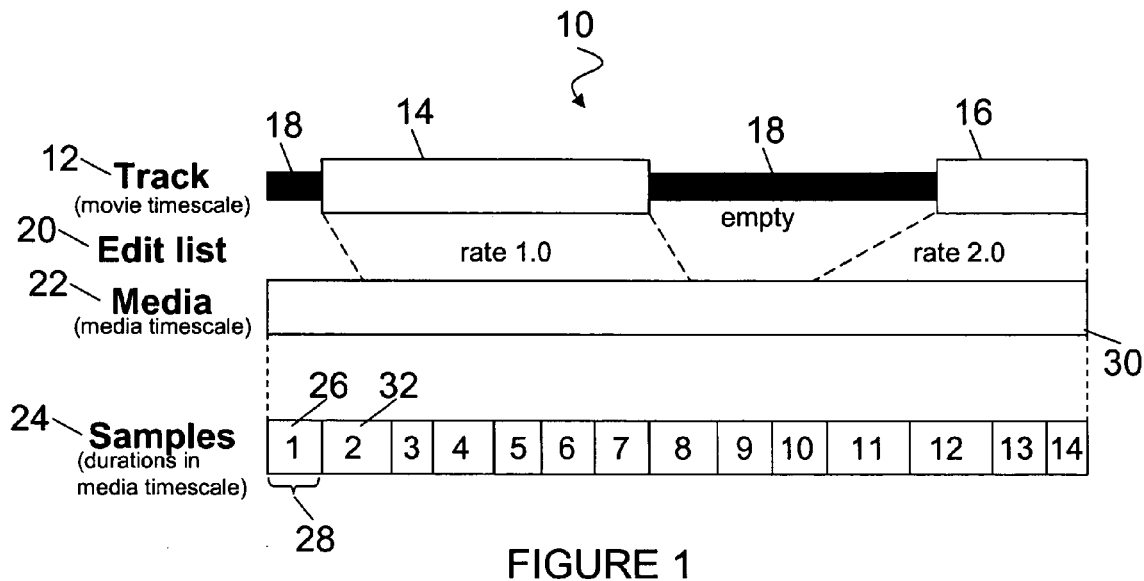
FIG. 1 is a block diagram of a media sequence with an integrated list of samples.
Figure 2:
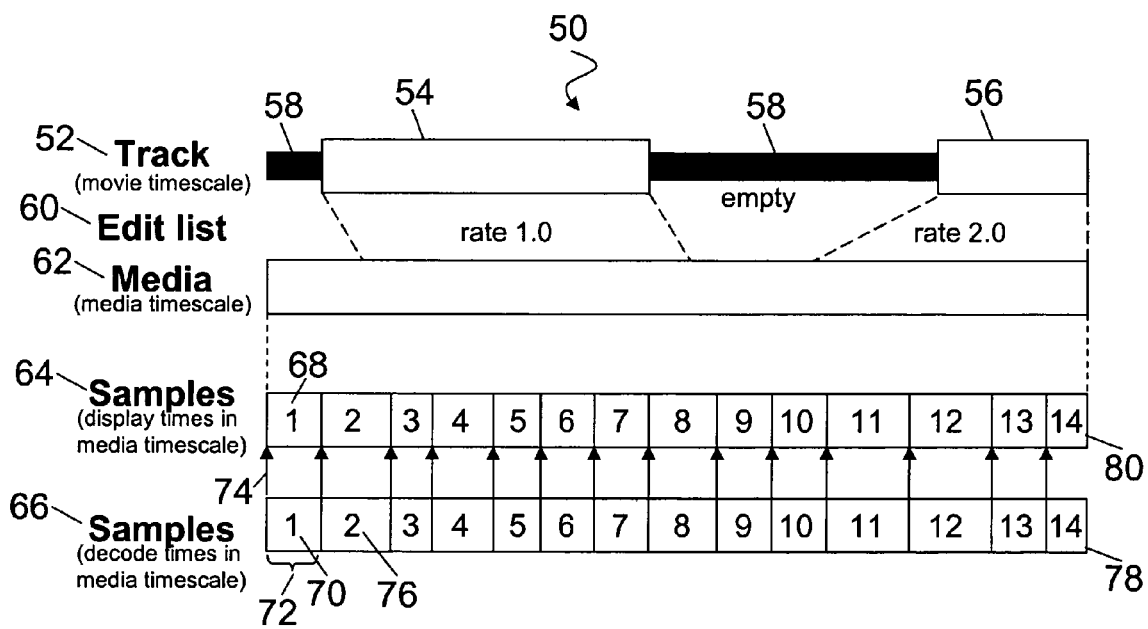
FIGS. 2-3 are block diagrams of a media sequence with separate display and decode lists.

FIG. 2 presents a media sequence 50, which is similar to the media sequence 10 presented with respect to FIG. 1. As described above, the media sequence 50 can be organized as a track 52 of digital video information that can include one or more image segments, such as the first image segment 54 and the second image segment 56. In turn, each of the image segments can be comprised of one or more samples, such as frames of image data. Additionally, the one or more image segments can be encoded in a variety of formats, such as .mpg, .jpg, and .avi, and image segments encoded in different formats can be included in the same track.

The track 52 also can include one or more empty segments 58, which are not associated with any video information and during which no video information is presented. In another implementation, the media sequence 50 can include two or more tracks of video information, and each of the tracks of video information can include one or more image segments. In such an implementation, an empty segment included in a first track can correspond temporally to an image segment included in a second track. In addition to the track 52 of digital video information, the media sequence 50 also can include one or more tracks of audio information and one or more tracks of text information (not shown).

Also as discussed above, the track 52 of digital video information represents the movie timescale and the image segments included in the track 52, such as the first image segment 54 and the second image segment 56, are sequentially ordered with respect to time. Further, the digital video information included in the track 52 can be encoded in a compressed format in order to reduce the amount of information that must be stored and to reduce the amount of bandwidth required to transmit the information. For example, the digital video information can be represented using only I-pictures, a combination of I-pictures and P-pictures, or a combination of I-pictures, P-pictures, and B-pictures.

The order of the image segments and the empty segments included in the track 52 is defined in the edit list 60. For each image segment and empty segment included in the track 52, there is a corresponding entry, or edit, in the edit list 60. Each edit defines parameters associated with the image segment or empty segment to which it corresponds. For example, an edit identifies the point in the movie timescale at which the corresponding image segment or empty segment is to begin. The edit also identifies the duration, expressed in terms of the movie timescale, over which the corresponding image segment or empty segment will be played. Further, with respect to image segments, an edit identifies the rate at which the corresponding image segment is to be played back. A playback rate of 1.0 can be associated with the first image segment 54 to indicate that playback should occur at a rate equal to the timing information associated with the first image segment 54. Similarly, a playback rate of 2.0 can be associated with the second image segment 56 to indicate that playback should occur at a rate equal to twice the timing information associated with the second image segment 56.

The media 62 incorporates the concept of a media timescale, which is a positive integer and is independent of the movie timescale associated with the track 52. The media can be subdivided into X units of media time, where X is a positive integer. The duration of each unit of media time can then be determined to be X÷(media timescale).

The one or more samples comprising each of the image segments presently or previously included in the track 52 are contained in the media 62. Unlike the media sequence 10 described with reference to FIG. 1, however, the media sequence 50 includes two separate but related lists of samples. The display list of samples 64 and the decode list of samples 66 each represent a sequential ordering of the samples contained in the media 62. In the display list of samples 64, for each of the image segments included in the media 62, all of the samples associated with a particular image segment are arranged in the order in which they are displayed during forward playback of that image segment. In the decode list of samples 66, for each of the image segments included in the media 62, all of the samples associated with a particular image segment are arranged in the order in which they are decoded during forward playback of that image segment. The display list of samples 64 also can be represented as a display timeline and the decode list of samples 66 can be represented as a decode timeline. Each sample identified in the decode list of samples 66 can be logically associated with a corresponding sample identified in the display list of samples 64 by a vector. For example, the first sample 70 identified in the decode list of samples 66 can be logically associated with the corresponding sample 68 identified in the display list of samples 64 by the first vector 74.

Once a sample has been added to the media 62, the sample cannot thereafter be removed from the media 62. The media 62 thereby ensures that every sample previously identified in the edit list 60 will be available if it is ever required in connection with the track 52. Further, once a sample has been added to the media, none of the intrinsic values associated with the sample can be modified. There is, however, one exception to this rule. If the sample is the last sample in the media 62, the sample decode duration corresponding to that sample can be increased by the amount required to make the media decode end time 78 equal the media display end time 80.

The multiple timeline schema is based on the decode order of the samples included in the media 62, not the display order of the samples. As such, a sample decode duration is associated with each sample. The sample decode duration, which is always a positive value, indicates the difference between the decode time of the associated sample and the decode time of the next sample. For example, a first sample decode duration 72 is associated with the first sample 70 identified in the decode list of samples 66. Therefore, the sample decode duration indicates the period of the first sample 70 expressed in media time. The sample decode duration 72 does not, however, identify the amount of time required to decode the first sample 70. Sample decode durations associated with the samples identified in the decode list of samples 66 are not required to be identical.

The media decode duration 78, or media decode end time 78, is equal to the sum of the sample decode durations for every sample included in the media 62. The first sample 70 included in the media 62 has a sample decode time of zero, which also represents the zero point of the media timescale. The second sample 76 included in the media 62 has a sample decode time equal to the first sample decode duration 72, because the sample decode time of the first sample 70 is zero. Each subsequent sample identified in the decode list of samples 66 has a sample decode time equal to the sum of the sample decode time of the preceding sample and the sample decode duration of the preceding sample. Therefore, the samples included in the media 62 partition the media time for the entire media decode duration 78 without any gaps.

Each sample included in the media 62 also has a sample display offset, which can be a positive value, zero, or a negative value. The display time of a sample can therefore be derived by summing the sample decode time and the sample display offset associated with that sample. Additionally, the display time associated with a sample cannot be negative. Therefore, if the display offset associated with a sample is a negative value, the magnitude of the display offset can be no greater than the sample decode time. The media display end time 80 is derived by summing the display time associated with the last sample included in the media 62 with the decode duration associated with the last sample included in the media 62.

The display duration of a sample is not an intrinsic property associated with that sample, but is instead determined with reference to other samples. If a sample with a subsequent display time exists in the media 62, the display duration of the present sample can be determined as the difference between the display time of the present sample and the display time of the subsequent sample. If no sample with a subsequent display time exists in the media 62, the display duration of the present sample can be set equal to a placeholder value, such as the sample decode duration associated with the sample. Further, because a fixed display duration is not associated with the samples included in the media 62, the display duration associated with a sample is subject to change if one or more additional samples with subsequent display times are added to the media 62.

As can be seen in FIG. 2, when the media sequence 50 contains only I-pictures, the display list of samples 64 and the decode list of samples 66 are identically ordered. For example, the first sample 70 identified in the decode list of samples 66 can be assigned the sample number 1. Because no reordering is required, the sample number 1 also appears as the first sample 68 identified in the display list of samples 64. Similarly, the display list of samples 64 and the decode list of samples 66 are identically ordered when the media sequence 50 contains I-pictures and P-pictures. In such circumstances, the zero point of the decode list of samples 66 can occur at the same point in time as the zero point of the display list of samples 64.

Because B-pictures provide for a greater degree of compression and flexibility, it is advantageous to compress and encode a media sequence using a combination of I-pictures, P-pictures, and B-pictures. In the event the media sequence 50 includes one or more B-pictures, however, the ordering of the samples in the display list of samples 64 and the ordering of the samples in the decode list of samples 66 will differ as a result of the reordering that is required between decode and display.

Figure 3:
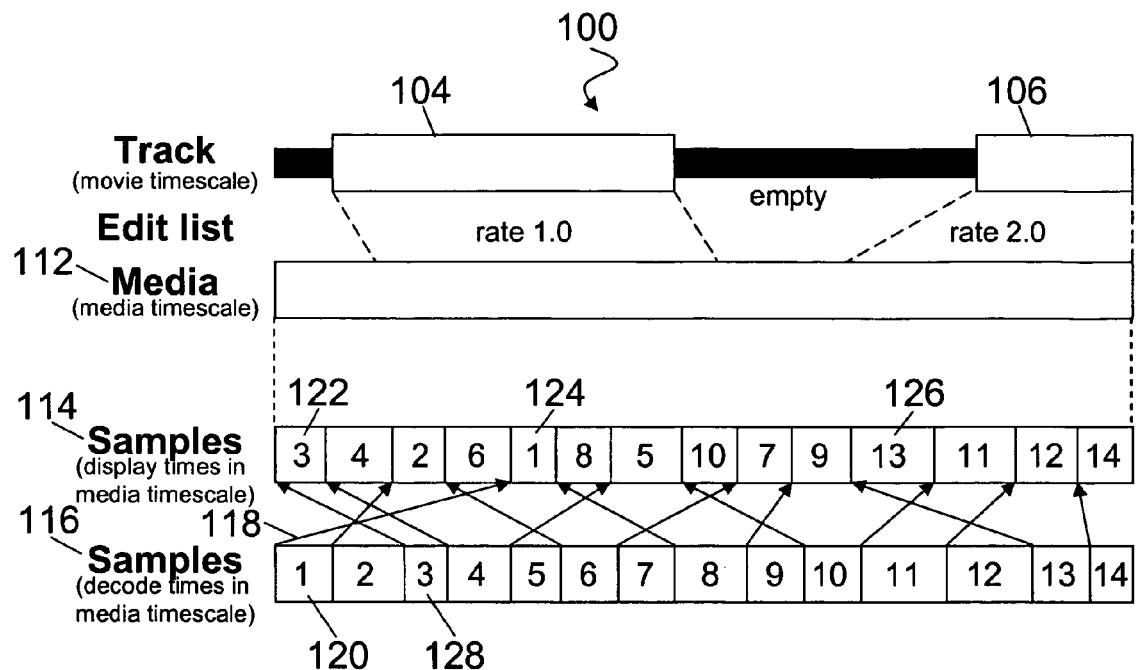

FIG. 3 presents a media sequence 100 that includes multiple B-pictures. The media sequence 100 is similar to the media sequence 50 described with respect to FIG. 2, with the exception of the display list of samples 114 and the decode list of samples 116. Because the one or more image segments included in the media 112, such as the first image segment 104 and the second image segment 106, contain one or more samples that have been compressed and encoded as B-pictures, the order of the samples identified in the decode list of samples 116 does not match the order of the samples identified in the display list of samples 114. For example, the first sample 120 identified in the decode list of samples 116 can be assigned the sample number 1. The corresponding sample 124 in the display list of samples 114, which is also assigned the sample number 1, is ordered as the fifth sample in the sequence. Similarly, the third sample 128 identified in the decode list of samples 116 can be assigned the sample number 3. The corresponding sample 122 in the display list of samples 114, which is also assigned the sample number 3, appears as the first sample in the sequence.

The reordering necessitated by the use of B-pictures is further illustrated by the vectors used to logically associate the samples identified in the decode list of samples 116 with the corresponding samples identified in the display list of samples 114, such as the first vector 118. As illustrated by the first vector 118, the first sample 120 identified in the decode list of samples 116 will be decoded prior to the decoding of any other samples included in the media 112, but it will not be immediately displayed. Therefore, decoding of the samples included in the media 112 must begin at some point in time prior to the display of those samples. As such, an advance decode time is also associated with the media 112. The advance decode time is set to equal the magnitude of the largest negative display offset associated with a sample identified in the display list of samples 114. It is possible for the advance decode time to be zero under certain circumstances, such as when the samples included in the media 112 are encoded as I-pictures and P-pictures.

The advance decode time represents the period by which the sample decode time associated with the first sample 120 identified in the decode list of samples 116 precedes the display time associated with the sample 122 identified in the display list of samples 114 as the sample to be displayed first. Therefore, the advance decode time can be used to correlate the decode timeline with the display timeline. As described above, the display time associated with the sample 122 identified in the display list of samples 114 as the sample to be displayed first can be determined by summing the sample decode time and the sample display offset associated with the sample 122. If a track is edited after the advance decode time has been determined, the advance decode time must be recalculated before the media sequence can be displayed.

Figure 4:
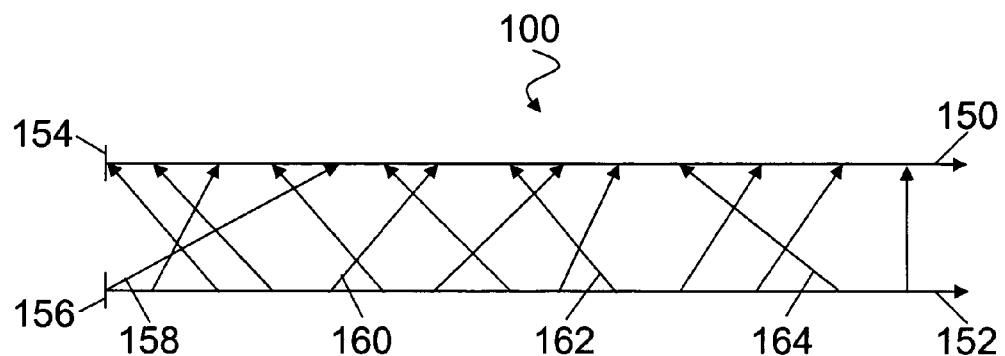
FIG. 4 is a timeline of a media sequence.

FIG. 4 presents a display timeline 150 and a decode timeline 152 associated with the media sequence 100 presented in FIG. 3. Vectors, such as the vector 158 that logically associates the first sample 120 identified in the decode list of samples 116 with the corresponding sample 124 identified in the display list of samples 114, graphically depict the display offsets associated with each of the samples included in the media 112. When the zero point 154 of the display timeline 150 is aligned with the zero point 156 of the decode timeline 152, it can be determined that the vectors associated with several samples, such as the vectors 158 and 160, indicate a positive display offset between the sample decode time and the corresponding display time associated with a particular sample. Other vectors, such as vectors 162 and 164, indicate a negative display offset between the sample decode time and the corresponding display time associated with a particular sample. The display time of a sample cannot occur prior to the sample decode time associated with that sample. Therefore, if any sample in the media is characterized by a negative display offset, the zero point 154 of the display timeline 150 cannot be aligned with the zero point 156 of the decode timeline 152.

In order to properly display the media sequence 100, the decode timeline 152 must be shifted backward in time with respect to the display timeline 150 by a period equal to the advance decode time. The vector 164 associated with the eleventh sample 126 identified in the display list of samples 114 in FIG. 3, represents the largest negative display offset of any sample included in the media 112. Therefore, the advance decode time is set to equal the magnitude of the display offset associated with the eleventh sample 126 identified in the display list of samples 114 in FIG. 3.

The display offsets associated with each of the samples included in the media 112 can be stored in a table. As a display offset of the same sign and magnitude may be associated with two or more consecutive samples, the display offsets associated with the samples can be efficiently represented using run length encoding. FIG. 5 presents an implementation of a display table 170 used to store the display offsets. The display table 170 includes a first column 172 indicating the count, which represents the number of consecutive frames that share a common display offset. The display table 170 also includes a second column 174 indicating the display offset measured in a common unit of time, such as media time. As one or more samples can be represented using B-pictures, the display offsets included in the display table 170 can include negative values. Each row of the display table 170 represents a number of consecutive frames included in the media that are associated with a common display offset. For example, the first row 176 of the display table 170 indicates that the first sample has a display offset of 20. The second row 178 of the display table 170 indicates that the two subsequent samples each have a display offset of −10. Further, the display table 170 can store the largest positive display offset 180 and the largest negative display offset 182. In another implementation, the largest positive display offset 180 and the largest negative display offset 182 can be derived from the display table 170 as needed.

As discussed above, a sample decode duration is associated with each sample included in the media. Because the same sample decode duration may be associated with two or more consecutive samples, the sample decode durations also can be efficiently represented using run length encoding. FIG. 6 presents an implementation of a decode table 190 used to store sample decode durations. The decode table 190 includes a first column 192 indicating the count, which represents the number of consecutive frames that share a common sample decode duration. The decode table 190 also includes a second column 194 indicating the sample decode duration measured in a common unit of time, such as media time. Each row of the decode table 190 represents a number of consecutive frames included in the media that are associated with a common sample decode duration. For example, the first row 196 of the decode table 190 indicates that four consecutive samples have a sample decode duration of 10. Additionally, the first row 196 corresponds to the first four samples included in the media. Further, the fourth row 198 of the decode table 190 indicates that sixteen consecutive samples, starting with the eighteenth sample included in the media, have a sample decode duration of 20.

Because P-pictures and B-pictures are ultimately decoded with reference to an I-picture, or key picture, a record identifying the samples that are encoded as I-pictures also can be maintained (not shown). During an operation in which a sample is selected other than through sequential play, such as scrubbing, the closest preceding I-picture can be accessed and used in decoding the selected sample. In order to identify which sample is associated with a particular point on the display timeline, however, it can be necessary to determine the corresponding sample decode time on the decode timeline. Additionally, in order to identify the next display time that will occur following a selected point on the display timeline, it can first be necessary to identify the sample that corresponds to the selected point. Therefore, it can be necessary to search the display timeline for a point corresponding to a known location on the decode timeline and also to search the decode timeline for a point corresponding to a known location on the display timeline. Conducting an end-to-end search of either timeline, however, is unnecessary.

Figure 7:
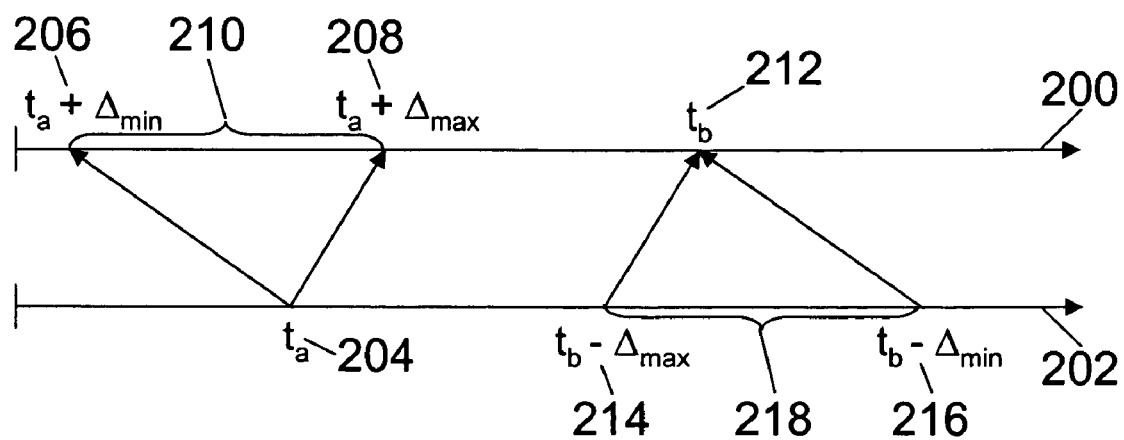
FIG. 7 is a timeline of a media sequence.

FIG. 7 illustrates that a search of the display timeline 200 or the decode timeline 202 can be limited to an identifiable search range using the largest positive display offset 180 and the largest negative display offset 182 included in the display table 170. For example, given a sample decode time $t_a$ 204 associated with a sample identified in the decode timeline 202, it can be understood that the corresponding display time can be no earlier than that given by the largest negative display offset 182, or $\Delta_{min}$. Therefore, the earliest point in the display timeline search range 210 can be represented as $t_a + \Delta_{min}$ 206. Further, given the sample decode time $t_a$ 204, it can be understood that the corresponding display time can be no later than that given by the largest positive display offset 180, or $\Delta_{max}$. Therefore, the latest point in the display timeline search range 210 can be represented as $t_a + \Delta_{max}$ 208.

A similar decode timeline search range 218 can be determined given a display time $t_b$ 212 in the display timeline 200. Given the display time $t_b$ 212, it can be understood that the corresponding sample decode time can be no earlier than that given by the largest positive display offset 180, or $\Delta_{max}$. Therefore, the earliest point in the decode timeline search range 218 can be represented as $t_b - \Delta_{max}$ 214. Further, given the display time $t_b$ 212, it can be understood that the corresponding decode time can be no later than that given by the largest negative display offset 182, or $\Delta_{min}$. Therefore, the latest point in the decode timeline search range 218 can be represented as $t_b - \Delta_{min}$ 216.

In another implementation, the display timeline search range 210 and the decode timeline search range 218 can be defined using different display offsets. For example, the largest positive and negative display offsets occurring within a predetermined period of the display time or decode time of interest can be selected, where the predetermined period is less than the full media duration.

Additionally, if the point $t_a$ 204 on the decode timeline 202 represents a point in time during a sample decode duration, rather than the sample decode time, the display timeline search range 210 can be shifted backward in time by an adjustment period, such as a period equal to the sample decode duration. Similarly, if the point $t_b$ 212 on the display timeline 200 represents a point in time during a display duration, rather than the display time, the decode timeline search range 218 can be shifted backward in time by an adjustment period, such as a period equal to the display duration.

Figure 8A:
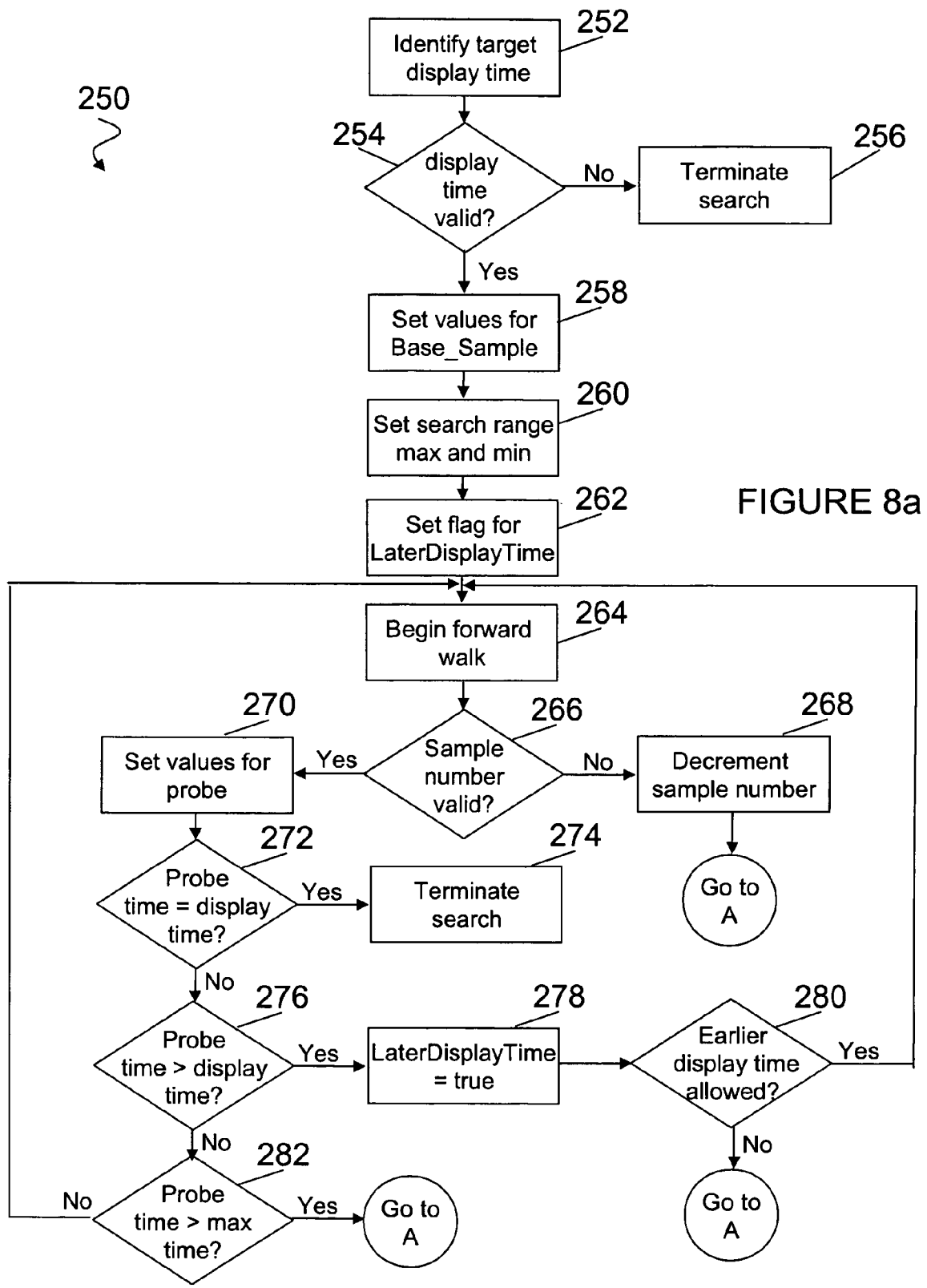
FIGS. 8-9 are flowcharts of timeline searching algorithms.
Figure 8B:
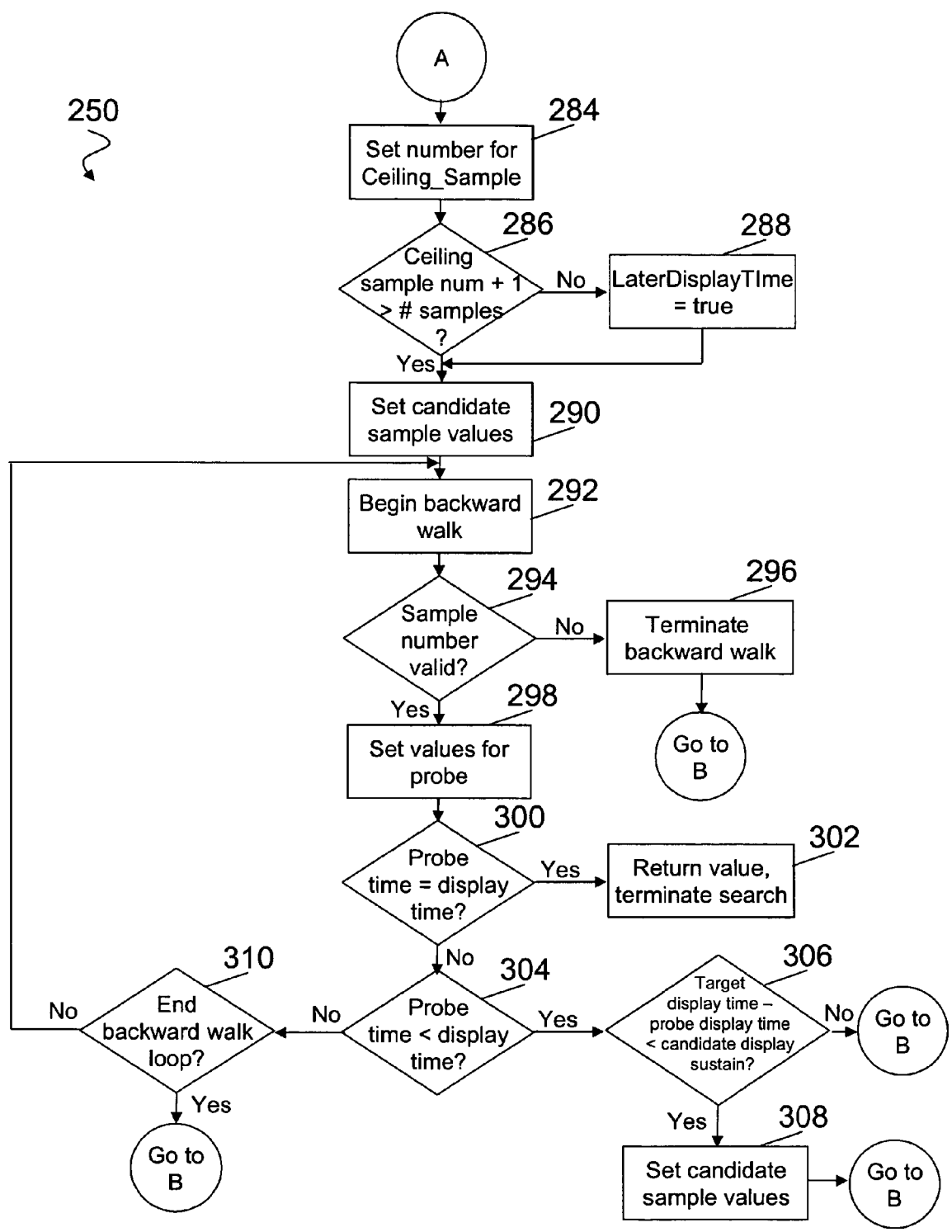
Figure 8C:
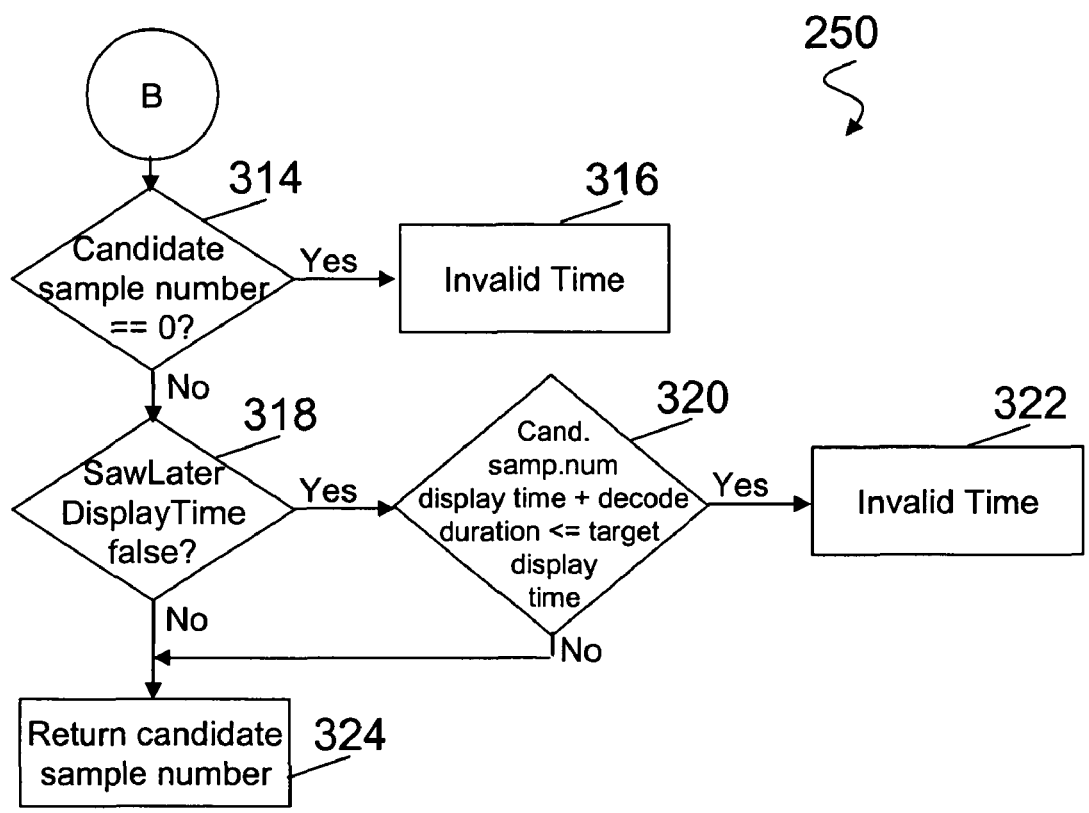

FIG. 8 describes a technique 250 for searching a decode timeline to identify a sample corresponding to a given point $t_t$ in a corresponding display timeline. The target display time corresponding to the point $t_t$ in the display timeline is identified (252). The target display time is compared with the display start time of the media and the display end time of the media. The target display time is valid if it occurs on or after the display start time of the media and before the display end time of the media (254). If the target display time is not valid, the search is terminated (256). If the target display time is valid, the point $t_s$ in the decode timeline characterized by the same time as the point $t_t$ in the display timeline is identified. BaseSampleNumber is set equal to the number of the sample associated with the sample decode time or sample decode duration occurring at the point $t_s$ in the decode timeline. Further, BaseDecodeTime is set equal to the sample decode time of the sample number corresponding to BaseSampleNumber (258).

As described above with respect to FIG. 7, the decode timeline search range is determined using the largest positive display offset, $\Delta_{max}$, and the largest negative display offset, $\Delta_{min}$, associated with the samples included in the media. GreatestDecodeTime is determined by subtracting the largest negative display offset, $\Delta_{min}$, from the point $t_s$ in the decode timeline. Further, LeastDecodeTime is determined by subtracting the largest positive display offset, $\Delta_{max}$, from the point $t_s$ in the decode timeline (260). Additionally, the flag SawLaterDisplayTime is set to equal false (262).

The forward walk loop is initiated by setting the value BaseSampleNumber+j, where j=1 for the first iteration of the forward walk loop. For each subsequent iteration of the forward walk loop, j is incremented such that j=j+1 (264). BaseSampleNumber+j is then compared with the number of samples included in the media. BaseSampleNumber+j is valid if it does not exceed the number of samples included in the media (266). If BaseSampleNumber+j is invalid, BaseSampleNumber+j is decremented such that BaseSampleNumber+j=BaseSampleNumber+j-1 and the forward walk loop is terminated (268). If BaseSampleNumber+j is valid, ProbeDecodeTime is set equal to the sample decode time associated with the sample number corresponding to BaseSampleNumber+j. Additionally, ProbeDisplayTime is set equal to the display time associated with the sample number corresponding to BaseSampleNumber+j (270).

ProbeDisplayTime is compared with the target display time (272). If ProbeDisplayTime equals the target display time, BaseSampleNumber+j is returned as the target sample number and the search is terminated (274). If ProbeDisplayTime does not equal the target display time, it is determined whether ProbeDisplayTime exceeds the target display time (276). If ProbeDisplayTime exceeds the target display time, the flag SawLaterDisplayTime is set to true (278). Additionally, the sample corresponding to BaseSampleNumber+j is examined to determine whether the flag SampleEarlierDisplayTimesAllowed is set to true (280). If the flag SampleEarlierDisplayTimesAllowed is set to true, BaseSampleNumber+j is incremented and an additional iteration of the forward walk loop is executed (264). If the flag SampleEarlierDisplayTimesAllowed is set to false, the forward walk loop is terminated.

If ProbeDisplayTime does not exceed the target display time, it is determined whether ProbeDisplayTime exceeds GreatestDecodeTime (282). If ProbeDisplayTime does not exceed GreatestDecodeTime, BaseSampleNumber +j is incremented and an additional iteration of the forward walk loop is executed (264). If ProbeDisplayTime exceeds GreatestDecodeTime, the forward walk loop is terminated.

CeilingSampleNumber is set equal to BaseSampleNumber+j (284). CeilingSampleNumber+1 is then compared with the number of samples in the media (286). If CeilingSampleNumber+1 is less than or equal to the number of samples in the media, the flag SawLaterDisplayTime is set to true (288). CandidateSampleNumber is set equal to 0 and CandidateDisplaySustain is assigned the maximum positive value of TimeValue64, which is a signed 64-bit integer (290).

The backward walk loop is initiated by setting the value CeilingSampleNumber-k, where k=0 for the first iteration of the backward walk loop. For each subsequent iteration of the backward walk loop, k is incremented such that k=k+1 (292). CeilingSampleNumber-k is then validated by determining whether CeilingSampleNumber-k is less than 1 (294). If CeilingSampleNumber-k is less than 1, it is invalid and the backward walk loop is terminated (296). If CeilingSampleNumber-k is valid, ProbeDecodeTime is set equal to the sample decode time associated with the sample number corresponding to CeilingSampleNumber-k. Additionally, ProbeDisplayTime is set equal to the display time associated with the sample number corresponding to CeilingSampleNumber-k (298).

ProbeDisplayTime is compared with the target display time to determine whether they are equal (300). If ProbeDisplayTime equals the target display time, CeilingSampleNumber-k is returned as the target sample number and the search is terminated (302). If ProbeDisplayTime is not equal to the target display time, it is determined whether ProbeDisplayTime is less than the target display time (304). If ProbeDisplayTime is less than the target display time, it is determined whether the target display time-ProbeDisplayTime is less than CandidateDisplaySustain (306). If the target display time-ProbeDisplayTime is less than CandidateDisplaySustain, CandidateDisplaySustain is set equal to the target display time-ProbeDisplayTime, CandidateSampleNumber is set equal to CeilingSampleNumber-k, and CandidateDisplayTime is set equal to the display time associated with the sample corresponding to CandidateSampleNumber (308). If the target display time-ProbeDisplayTime is greater than or equal to CandidateDisplaySustain, the backward walk loop is terminated.

If ProbeDisplayTime is greater than or equal to the target display time, it is determined whether CandidateSampleNumber is equal to 0 or whether ProbeDecodeTime+GreatestDisplayOffset is greater than CandidateDisplayTime (310). If CandidateSampleNumber is equal to 0 or ProbeDecodeTime+GreatestDisplayOffset is greater than CandidateDisplayTime, CeilingSampleNumber-k is decremented and an additional iteration of the backward walk loop is executed (292). Otherwise, the backward walk loop is terminated.

CandidateSampleNumber is evaluated to determine whether it equals 0 (314). If CandidateSampleNumber equals 0, no sample corresponding to the target display time was located during the search and an invalid time indicator is returned (316). Alternatively, if CandidateSampleNumber does not equal 0, it is determined whether the flag SawLaterDisplayTime is set to false (318). If the flag SawLaterDisplayTime is set to false, it is determined whether the display time associated with CandidateSampleNumber+the sample decode duration of the sample corresponding to CandidateSampleNumber is less than or equal to the target display time (320). If the display time associated with CandidateSampleNumber+the sample decode duration of the sample corresponding to CandidateSampleNumber is less than or equal to the target display time, an invalid time indicator is returned (322). If the flag SawLaterDisplayTime is set to true, or if the flag SawLaterDisplayTime is set to false and the display time associated with CandidateSampleNumber+the sample decode duration of the sample corresponding to CandidateSampleNumber is greater than the target display time, CandidateSampleNumber is returned as the sample number corresponding to the target display time (324).

Figure 9:
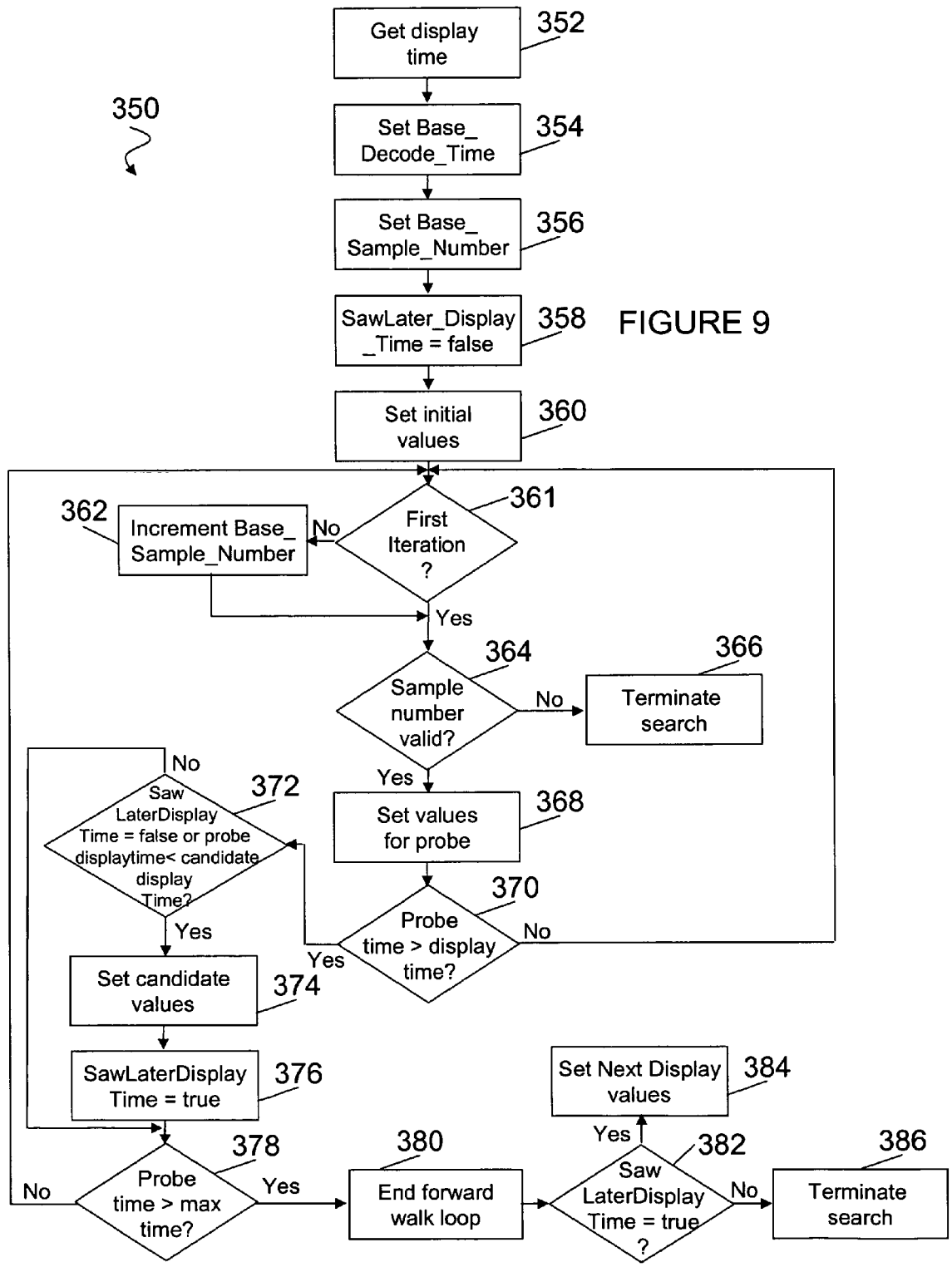

FIG. 9 describes a technique 350 for identifying the next display time in the display timeline based on a present sample. DisplayTime is set equal to the display time corresponding to the present sample (352). BaseDecodeTime is set equal to DisplayTime–the largest positive display offset, $\Delta_{max}$. If DisplayTime—the largest positive display offset, $\Delta_{max}$, is less than 0, BaseDecodeTime is set equal to 0 (354). BaseSampleNumber is set equal to the sample number corresponding to BaseDecodeTime (356). The sample number corresponding to BaseDecodeTime can be determined by searching the corresponding decode table, such as the decode table 190 presented with respect to FIG. 6. A time variable T can be initialized to a decode time zero and a sample variable S can be initialized to 1. While T is less than the BaseDecodeTime, each row of the decode table can be successively referenced. For each row of the decode table that is referenced, T can be incremented by the product of the count and the sample decode duration. Additionally, S can be incremented by count. Once T is greater than or equal to the BaseDecodeTime, T can be divided by the duration corresponding to the current row of the decode table, and the result can be subtracted from S to arrive at the sample number corresponding to BaseDecodeTime. Additionally, the values associated with the variables S and T can be saved for use as the starting point of a subsequent search. If T is greater than the BaseDecodeTime in a subsequent search, the decode table can be traversed in reverse by successively subtracting the product of the count and the sample decode duration from T and the count from the S. Once determined, BaseSampleNumber represents the lower bound on the sample number that could correspond to the next display time. Further, the flag SawLaterDisplayTime is set to false (358).

Before beginning the forward walk loop, CandidateSampleNumber and CandidateDisplayTime are each set to equal 0. Additionally, BaseSampleNumber+j, is initialized such that j=0 for the first iteration of the forward walk loop (360). Before executing an iteration, it is first determined whether the forward walk loop is in its first iteration (361). For all but the first iteration of the forward walk loop, j is incremented such that j=j+1 (362). BaseSampleNumber+j is compared with the number of samples included in the media. BaseSampleNumber+j is valid unless it exceeds the number of samples included in the media (364). If BaseSampleNumber+j is invalid, the search is terminated (366). If BaseSampleNumber+j is valid, ProbeDecodeTime is set equal to the sample decode time associated with the sample corresponding to BaseSampleNumber+j. Additionally, ProbeDisplayTime is set equal to the display time associated with the sample corresponding to BaseSampleNumber+j (368).

ProbeDisplayTime is then compared with DisplayTime (370). If ProbeDisplayTime is less than or equal to DisplayTime, BaseSampleNumber+j is incremented and an additional iteration of the forward walk loop is executed (362). If ProbeDisplayTime is greater than DisplayTime, it is determined whether the flag SawLaterDisplayTime is set to false or ProbeDisplayTime is less than CandidateDisplayTime (372). If the flag SawLaterDisplayTime is set to true and ProbeDisplayTime is greater than or equal to CandidateDisplayTime, then ProbeDecodeTime is evaluated to determine whether it is greater than GreatestDecodeTime (378).

If either the flag SawLaterDisplayTime is set to false or ProbeDisplayTime is less than CandidateDisplayTime, then CandidateDisplayTime is set equal to ProbeDisplayTime, CandidateSampleNumber is set equal to BaseSampleNumber+j, and GreatestDecodeTime is set equal to CandidateDisplayTime–the largest negative display offset, or $\Delta_{min}$ (374). Additionally, the flag SawLaterDisplayTime is set to true (376). ProbeDecodeTime is then evaluated to determine whether it is greater than GreatestDecodeTime (378).

If ProbeDecodeTime is less than or equal to GreatestDecodeTime, BaseSampleNumber+j is incremented and an additional iteration of the forward walk loop is executed (362). If ProbeDecodeTime is greater than GreatestDecodeTime, the forward walk loop is terminated (380). The flag SawLaterDisplayTime is evaluated to determine whether it is set to true (382). If the flag SawLaterDisplayTime is set to true, CandidateSampleNumber is returned as the sample to be displayed next, the next display time is set equal to CandidateDisplayTime, and the search is terminated (384). If the flag SawLaterDisplayTime is set to false, there is no next display time and the search is terminated (386).

In another implementation, the technique 350, described with respect to FIG. 9, can be used to execute a reverse search. In order to identify the previous display time based on a present sample, the technique 350 can be initiated by setting DisplayTime=DisplayTime–1.

Figure 10:
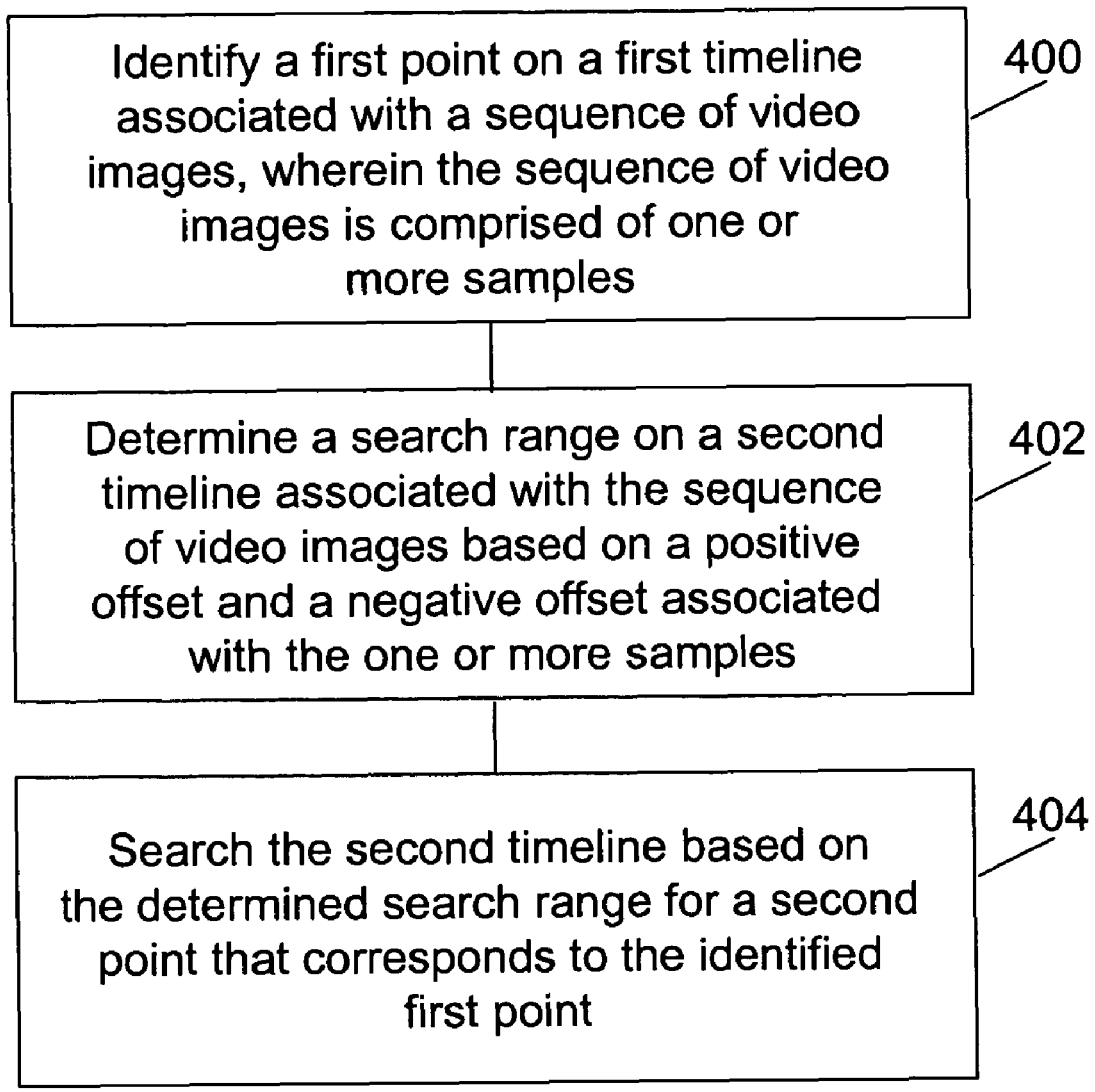
FIG. 10 is a flowchart of a method of searching using related timelines.

FIG. 10 describes a method of searching multiple related timelines representing a sequence of video images. In a first step 400, a first point on a first timeline associated with a sequence of video images is identified, wherein the sequence of video images is comprised of one or more samples. In a second step 402 a search range on a second timeline associated with the sequence of video images is determined based on a positive offset and a negative offset associated with the one or more samples. Once the search range has been determined, the third step 404 is to search the second timeline based on the determined search range for a second point that corresponds to the identified first point.

A number of implementations have been disclosed herein. Nevertheless, it will be understood that various modifications may be made without departing from the spirit and scope of the claims. Accordingly, other implementations are within the scope of the following claims.

What is claimed is:

1. A method of searching multiple related timelines representing a sequence of video images, the method comprising:
    identifying a first point on a first timeline associated with a sequence of video images, wherein the sequence of video images is comprised of one or more samples;
    determining a search range on a second timeline associated with the sequence of video images based on a positive offset and a negative offset associated with the one or more samples; and
    searching the second timeline based on the determined search range for a second point that corresponds to the identified first point.

2. The method of claim 1, further comprising associating a display offset with each of the samples comprising the sequence of video images, wherein one or more of the display offsets comprises a negative value.

3. The method of claim 2, wherein determining a search range further comprises determining a search range on the second timeline based on a maximum positive display offset and a maximum negative display offset associated with the one or more samples.

4. The method of claim 3, further comprising adjusting the search range if the first point occurs within a decode duration or a display duration.

5. The method of claim 4, wherein the search range is extended backward in time by a period equal to the decode duration or the display duration in which the first point occurs.

6. The method of claim 2, further comprising storing the display offsets associated with the samples comprising the sequence of video images in a data structure, wherein the display offsets are run length encoded.

7. The method of claim 1, further comprising identifying a sample number associated with the second point.

8. A system for searching multiple related timelines representing a sequence of video images, the system comprising processor electronics configured to:
   identify a first point on a first timeline associated with a sequence of video images, wherein the sequence of video images is comprised of one or more samples;
   determine a search range on a second timeline associated with the sequence of video images based on a positive offset and a negative offset associated with the one or more samples; and
   search the second timeline based on the determined search range for a second point that corresponds to the identified first point.

9. The system of claim 8, wherein the processor electronics are further configured to associate a display offset with each of the samples comprising the sequence of video images and one or more of the display offsets can comprise a negative value.

10. The system of claim 9, wherein the processor electronics are further configured to determine a search range on the second timeline based on a maximum positive display offset and a maximum negative display offset associated with the one or more samples.

11. The system of claim 10, wherein the processor electronics are further configured to adjust the search range if the first point occurs within a decode duration or a display duration.

12. The system of claim 11, wherein the processor electronics are further configured to extend the search range backward in time by a period equal to the decode duration or the display duration in which the first point occurs.

13. The system of claim 9, wherein the processor electronics are further configured to store the display offsets associated with the samples comprising the sequence of video images in a data structure, wherein the display offsets are run length encoded.

14. The system of claim 8, wherein the processor electronics are further configured to identify a sample number associated with the second point.

* * * * *